United States Patent [19]

Brown

[11] 3,827,734
[45] Aug. 6, 1974

[54] PIPE COUPLINGS
[75] Inventor: Kenneth Brown, Edlington, England
[73] Assignee: Hipworth Plastics Limited, Sheffield, England
[22] Filed: Feb. 26, 1973
[21] Appl. No.: 335,724

[30] Foreign Application Priority Data
Jan. 27, 1973 Great Britain...................... 4283/73

[52] U.S. Cl............. 285/379, 285/423, 285/DIG. 22
[51] Int. Cl.............................................. F16l 17/00
[58] Field of Search.................. 277/DIG. 2, DIG. 3; 285/374, 345, DIG. 16, DIG. 22, 423

[56] References Cited
UNITED STATES PATENTS
3,544,119   12/1970   Glover................................ 285/379
FOREIGN PATENTS OR APPLICATIONS
1,384,638   11/1964   France......................... 285/DIG. 22

*Primary Examiner*—Dave W. Arola
*Attorney, Agent, or Firm*—Lowe, King and Price

[57] ABSTRACT

A sealing ring is retained in an enlargement at the outer end of a plastics pipe coupling socket by a channel-section plastics retaining ring with snap-over engagement of its outer limb with the outside of the enlargement, with the inner limb fitting closely to the inside of the enlargement and terminating in an annular face having a radial extent substantially equal to the radial extent of an inner end face of the enlargement and spaced therefrom by at least the axial thickness of the sealing ring, the close fit of the inner limb of the retaining ring to the inside of the enlargement ensuring that the retaining ring will not twist off under pressure from within the socket, while the snap-over engagement prevents the retaining ring being pushed off.

5 Claims, 3 Drawing Figures

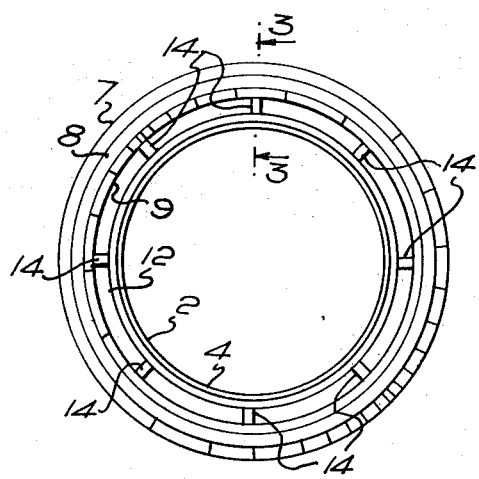
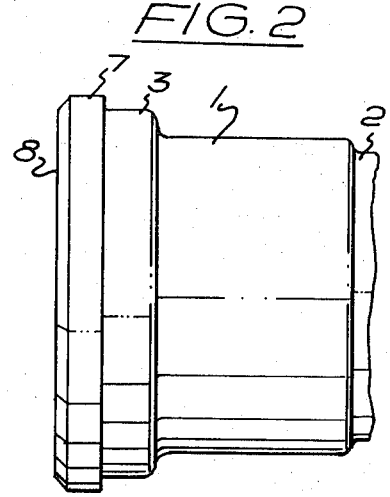
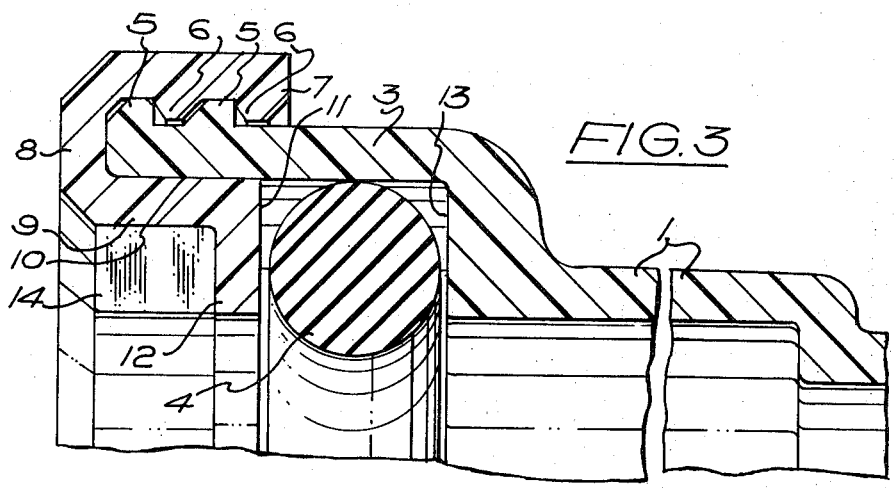

PIPE COUPLINGS

This invention relates to pipe couplings of the type in which a socket is formed at one end of a plastics pipe-length or pipe fitting and has an enlargement at its outer end housing a sealing ring for making sealing contact round the whole periphery of the spigot end of a pipe-length inserted into the socket.

In British Pat. specification No. 1,175,503 the sealing ring is retained in the enlargement by a plastics retaining ring which is itself retained in the socket enlargement by an inwardly projecting rib or lip moulded integrally with the mouth of the enlargement, the rib or lip being limited in its radial extent so that it can be stripped off a non-collapsing core without being damaged. However, the limited radial extent of the rib or lip can be disadvantageous in that pressure from within the socket may force the retaining ring (and, therefore, the sealing ring also) out of the socket englargement past the rib or lip.

The object of the invention is to avoid the above disadvantage.

According to the present invention, a pipe coupling socket is formed at one end of a plastics pipe-length or pipe fitting and has an enlargement at its outer end housing a sealing ring for making sealing contact round the whole periphery of the spigot end of a pipe-length inserted into the socket, and the outside of the socket enlargement is provided with at least one circumferential rib for snap-over engagement by a rib on the inside of an outer limb of a channel-section plastics retaining ring an inner limb of which fits closely to the inside wall of the socket enlargement and terminates in an annular face having a radial extent substantially equal to the radial extent of an inner end face of the socket enlargement and spaced therefrom by at least the axial thickness of the sealing ring.

The close fit of the inner limb of the retaining ring to the inside wall of the socket enlargement ensures that the retaining ring will not twist off under pressure from within the socket, while the snap-over ribs resist pushing off of the retaining ring.

The inner limb of the retaining ring preferably terminates in an inwardly projecting annular flange, so that the inner limb of the retaining ring can have a lesser thickness (preferably generally similar to the thickness of the outer limb) than the radial extent of the annular face, thus economising on plastics material in the retaining ring. However, a series of circumferentially spaced gussets may be provided integral with the inner limb of the retaining ring and the inwardly projecting annular flange, so that the latter is afforded greater rigidity against deflection under pressure from within the socket.

The outside of the socket enlargement is preferably provided with two circumferential ribs for snap-over engagement by two ribs on the inside of the outer limb of the retaining ring, to increase the resistance to pushing off of the retaining ring under pressure from within the socket, or if the outer limb should be accidentally struck.

One embodiment of the invention will now be described, by way of example only, with reference to the accompanying drawings, in which:

FIG. 1 is an end view of a pipe coupling socket according to the invention;

FIG. 2 is a side view of the socket of FIG. 1; and

FIG. 3 is an enlarged fragmentary section from the line 3—3 of FIG. 1.

The pipe coupling socket 1 of the drawings is formed at one end of a plastics pipe-length or pipe fitting 2 and has an enlargement 3 at its outer end housing a sealing ring 4 for making sealing contact round the whole periphery of the spigot end (not shown) of a pipe-length inserted into the socket, and the outside of the enlargement 3 has two circumferential ribs 5 for snap-over engagement by two ribs 6 on the inside of an outer limb 7 of a channel-section plastics retaining ring 8 an inner limb 9 of which is in contact with the inside wall 10 of the enlargement 3 and terminates in an annular face 11 extending over a flange 12 with a radial extent substantially equal to the radial extent of an inner end face 13 of the socket enlargement 3 and spaced therefrom by more than the axial thickness of the sealing ring.

The close fit of the inner limb 9 of the retaining ring 8 to the inside wall 10 of the socket enlargement 3 ensures that the retaining ring will not twist off under pressure from within the socket 1, while the snap-over ribs 5, 6 resist pushing off of the retaining ring. A series of circumferentially spaced gussets 14 integral with the inner limb 9 of the retaining ring 8 and the flange 12 affords the latter greater rigidity against deflection under pressure from within the socket 1.

What I claim is:

1. A plastics pipe coupling socket having an enlargement at its outer end, said enlargement having a radially extending inner face, said enlargement housing a sealing ring for making sealing contact with said enlargement and round the whole periphery of the spigot end of a pipe-length inserted into the socket, a channel shaped plastics retaining ring having inner and outer limbs integrally connected together by a bridging portion, said outer limb having a rib on the inside surface thereof, the outside of the socket enlargement being provided with at least one circumferential rib for snap-over engagement by said rib on the inside of the outer limb of said channel-section plastics retaining ring, said inner limb of which fits closely to the inside wall of the socket enlargement and terminates in an inwardly projecting annular flange having a radial extent substantially equal to the radial extent of said inner end face of the socket enlargement and spaced therefrom by at least the axial thickness of the sealing ring, and a series of circumferentially spaced gussets being provided integral with the inner limb of the retaining ring and the inwardly projecting annular flange.

2. The pipe coupling socket of claim 1 wherein said inner limb of the retaining ring projects axially within the socket enlargement for a distance including the location of said circumferential rib.

3. A pipe coupling socket as in claim 1, wherein the inner limb of the retaining ring has a generally similar thickness to the thickness of the outer limb.

4. A pipe coupling socket as in claim 1, wherein said outer limb has two ribs on the inside surface thereof, and the outside of the socket enlargement is provided with two circumferential ribs for snap-over engagement by the said two ribs on the inside of the outer limb of the retaining ring.

5. The pipe coupling socket of claim 4 wherein said inner limb of the retaining ring projects axially within the socket enlargement for a distance including the locations of said two circumferential ribs.

* * * * *